(12) United States Patent
Qingsong et al.

(10) Patent No.: US 11,146,445 B2
(45) Date of Patent: Oct. 12, 2021

(54) TIME SERIES DECOMPOSITION

(71) Applicant: Alibaba Group Holding Limited, Grand Cayman (KY)

(72) Inventors: Wen Qingsong, Issaquah, WA (US); Jingkun Gao, Bellevue, WA (US); Xiaomin Song, Issaquah, WA (US); Liang Sun, Bellevue, WA (US); Huan Xu, Bellevue, WA (US); Wotao Yin, Bellevue, WA (US); Tao Yao, Bellevue, WA (US)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 16/700,931

(22) Filed: Dec. 2, 2019

(65) Prior Publication Data

US 2021/0168019 A1 Jun. 3, 2021

(51) Int. Cl.
*H04L 12/24* (2006.01)

(52) U.S. Cl.
CPC ........ *H04L 41/064* (2013.01); *H04L 41/0604* (2013.01); *H04L 41/065* (2013.01); *H04L 41/0677* (2013.01)

(58) Field of Classification Search
CPC . H04L 41/064; H04L 41/065; H04L 41/0677; H04L 41/0604
See application file for complete search history.

(56) References Cited

U.S. PATENT DOCUMENTS

| | | | | |
|---|---|---|---|---|
| 2014/0310235 | A1* | 10/2014 | Chan | G06F 11/3003 707/603 |
| 2015/0178945 | A1* | 6/2015 | Haimi-Cohen | G06K 9/00771 382/107 |
| 2016/0140584 | A1* | 5/2016 | Moghtaderi | G06Q 30/0202 705/7.31 |
| 2016/0335224 | A1* | 11/2016 | Wohlberg | G06T 5/001 |
| 2018/0157680 | A1* | 6/2018 | Valsesia | G06F 16/583 |
| 2019/0102276 | A1* | 4/2019 | Dang | H04L 67/1097 |
| 2019/0378246 | A1* | 12/2019 | Prentice | G06T 5/20 |
| 2020/0027046 | A1* | 1/2020 | Woods | G06F 16/2462 |
| 2020/0036459 | A1* | 1/2020 | Menon | H04B 17/354 |

OTHER PUBLICATIONS

Elgabli et al, GADMM:Fast and Communication Efficient Framework for Distributed Machine Learning, Mar. 2020, Journal of Machine Learning Research (Year: 2020).*

(Continued)

*Primary Examiner* — Philip C Lee
(74) *Attorney, Agent, or Firm* — Lee & Hayes, P.C.

(57) ABSTRACT

Time series decomposition method and system are provided. Time series data including at least a seasonality component is received. A noise removal filter may be applied to the time series data. Furthermore, a trend component and the seasonality component are extracted from the time series data. A residual component may subsequently be extracted from the time series data based on the trend component and the seasonality component. Anomaly detection may then be performed on the trend component or the residual component to determine whether an anomaly exists in the time series data.

17 Claims, 5 Drawing Sheets

(56) References Cited

OTHER PUBLICATIONS

Wen et al, Fast RobustSTL: Efficient and Robust Seasonal—Trend Decomposition for Time Series with Complex Patterns, Aug. 2020, Association for Computing Machinery (Year: 2020).*

Elgabli et al., Q-GADMM: Quantized Group ADMM for Communication Efficient Decentralized Machine Learning, 2020, IEEE, pp. 8876-8880 (Year: 2020).*

Wen et al, RobustSTL: A Robust Seasonal-Trend Decomposition Algorithm for Long Time Series, Jul. 17, 2019, Association for the Advancement of Artificial Intelligence, pp. 5409-5416 (Year: 2019).*

* cited by examiner

TIME SERIES DECOMPOSITION

BACKGROUND

A time series is a series of data points indexed in an order of time. Examples of time series may include daily numbers of users accessing a certain website, daily closing values of a certain stock index, daily numbers of vehicles passing a certain road, etc. These time series include information that is valuable and useful for time series tasks such as anomaly detection, forecasting and classification, etc. Nevertheless, a time series normally exhibits a complex pattern, which may include, for example, components associated with trend, seasonality (or periodicity), outliers, and noises. In order to facilitate and improve performance of subsequent time series tasks as described above, the time series usually needs to be robustly and accurately decomposed into various components (such as a trend component, a seasonality component, a noise component, etc.), before a time series task (such as anomaly detection) is performed.

Various methods, such as a standard STL (seasonal-trend composition using Loess), have been proposed for decomposition of a time series. However, these proposed methods are either computationally intensive, or too inflexible to adapt to various conditions (such as long time period, high noise, outliers, trend changes, etc.) of a time series. Furthermore, these time series decomposition methods may be based on models (e.g., a Gaussian noise model) that are not realistic for real-world time series.

SUMMARY

This summary introduces simplified concepts of a time series decomposition system, which will be further described below in the Detailed Description. This summary is not intended to identify essential features of the claimed subject matter, nor is it intended for use in limiting the scope of the claimed subject matter.

This disclosure describes example implementations of a time series decomposition system. In implementations, time series data including at least a seasonality component with known seasonality length is received. In implementations, the time series data may further include a trend component that may be constant (i.e., no trend), or a trend component that may be slowly changing or with abrupt changes. A noise removal filter may be applied to the time series data. Furthermore, the trend component and the seasonality component are extracted from the time series data. A residual component may subsequently be extracted from the time series data based on the trend component and the seasonality component. Anomaly detection may then be performed on the trend component or the residual component to determine whether an anomaly exists in the time series data.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
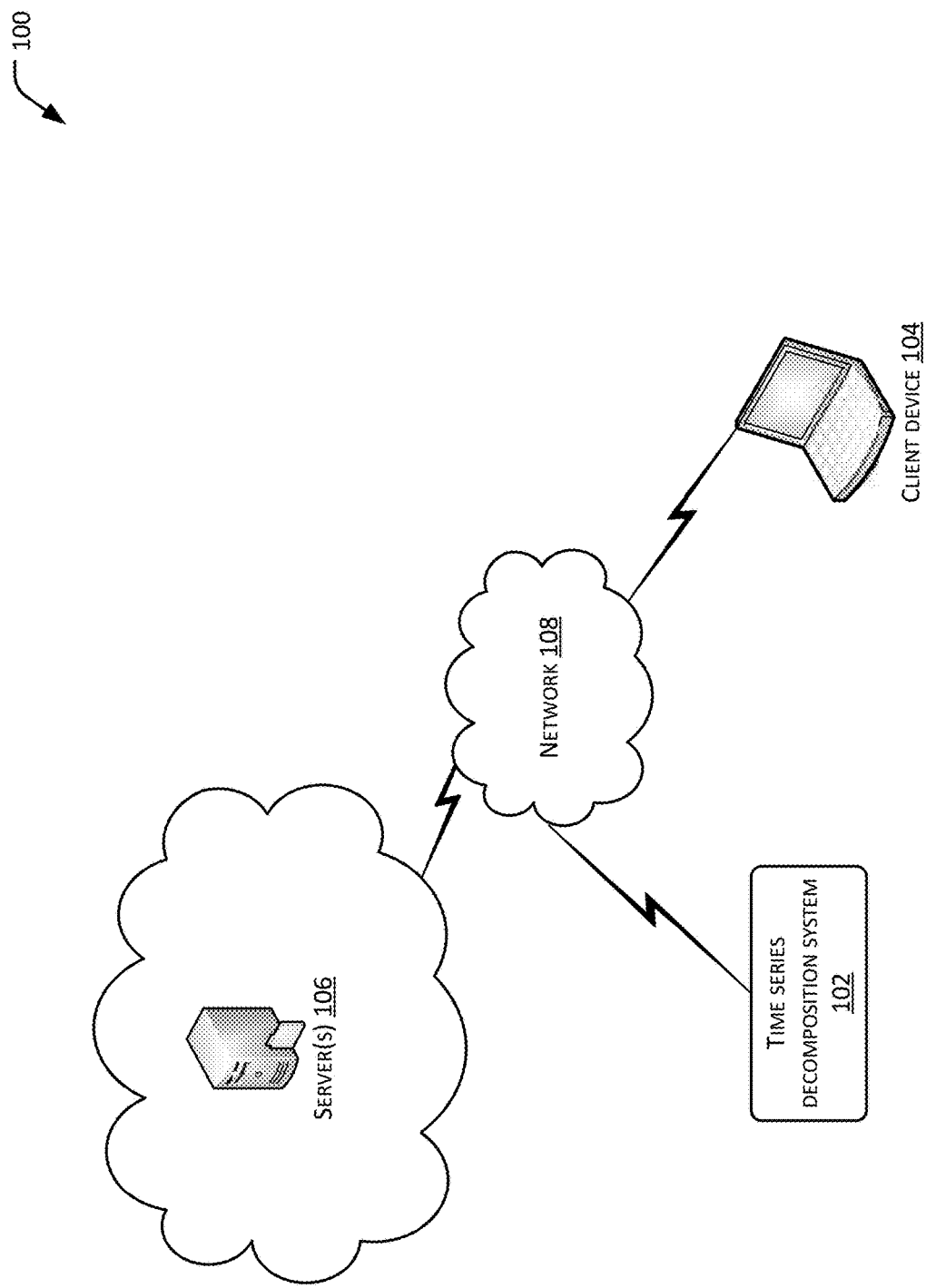
FIG. 1 illustrates an example environment in which a seasonal-trend composition system may be used.

As noted above, existing time series decomposition methods are either computationally intensive, or inflexible to adapt to various conditions (such as long time period, high noise, outliers, trend changes, etc.) of a time series.

This disclosure describes an example time series decomposition system. The time series decomposition system may receive time series data, and remove noise and outliers from the time series data. The time series decomposition system may then decompose the time series data into various components, for example, a trend component, a seasonality component, and a residual component, based on a particular decomposition method. In implementations, the trend component may include a trend that is changing (slowly or abruptly), and the seasonality component may include a seasonality shift or fluctuation.

After obtaining the various components, the time series decomposition system may perform anomaly detection on the trend component or the residual component to determine whether an anomaly exists in the time series data. Alternatively, the time series decomposition system may predict a future data point for the time series data based on the trend component, the seasonality component, and the residual component. Since the time series decomposition system can perform the above decomposition efficiently in real time, the time series decomposition system can perform decomposition of a time series in an online mode, and therefore is also suitable for processing streaming time series data.

In implementations, functions described herein to be performed by the time series decomposition system may be performed by multiple separate units or services. For example, a receiving service may receive time series data, while a filtering service may remove outliers and noise from the time series data. A decomposition service decomposes the time series data into a trend component, a seasonality component and a residual component, and a detection service may determine whether an anomaly exists in the time series data based on the trend component and/or the residual component. In implementations, a forecasting service may predict a future data point for the time series data based on the trend component, the seasonality component, and the residual component.

Moreover, although in the examples described herein, the time series decomposition system may be implemented as a combination of software and hardware installed in a single device, in other examples, the time series decomposition system may be implemented and distributed in multiple devices or as services provided in one or more computing devices over a network and/or in a cloud computing architecture.

The application describes multiple and varied embodiments and implementations. The following section describes an example framework that is suitable for practicing various implementations. Next, the application describes example systems, devices, and processes for implementing a time series decomposition system.

Example Environment

FIG. 1 illustrates an example environment 100 usable to implement a time series decomposition system. The environment 100 may include a time series decomposition system 102. In this example, the time series decomposition system 102 is described to exist as an individual entity or device. In some instances, the time series decomposition system 102 may be included in a computing device, such as a client device 104. In other instances, the time series decomposition system 102 may be included in one or more servers, such as one or more servers 106 in a cloud. For example, some or all of the functions of the time series decomposition system 102 may be included in or provided by the client device 104, and/or the one or more servers 106, which are connected and communicated via a network 108.

In implementations, the client device 104 may be implemented as any of a variety of computing devices including, but not limited to, a desktop computer, a notebook or portable computer, a handheld device, a netbook, an Internet appliance, a tablet or slate computer, a mobile device (e.g., a mobile phone, a personal digital assistant, a smart phone, etc.), a server computer, etc., or a combination thereof.

The network 108 may be a wireless or a wired network, or a combination thereof. The network 108 may be a collection of individual networks interconnected with each other and functioning as a single large network (e.g., the Internet or an intranet). Examples of such individual networks include, but are not limited to, telephone networks, cable networks, Local Area Networks (LANs), Wide Area Networks (WANs), and Metropolitan Area Networks (MANS). Further, the individual networks may be wireless or wired networks, or a combination thereof. Wired networks may include an electrical carrier connection (such a communication cable, etc.) and/or an optical carrier or connection (such as an optical fiber connection, etc.). Wireless networks may include, for example, a WiFi network, other radio frequency networks (e.g., Bluetooth®, Zigbee, etc.), etc.

In implementations, the time series decomposition system 102 may receive time series data, and remove noise and outliers from the time series data. The time series decomposition system 102 may then decompose the time series data into various components such as a trend component, a seasonality component, and a residual component. After obtaining the various components, the time series decomposition system 102 may perform anomaly detection on the trend component or the residual component to determine whether an anomaly exists in the time series data. Additionally or alternatively, the time series decomposition system 102 may predict a future data point for the time series data based on the trend component, the seasonality component, and the residual component.

Example Time Series Decomposition System

Figure 2:
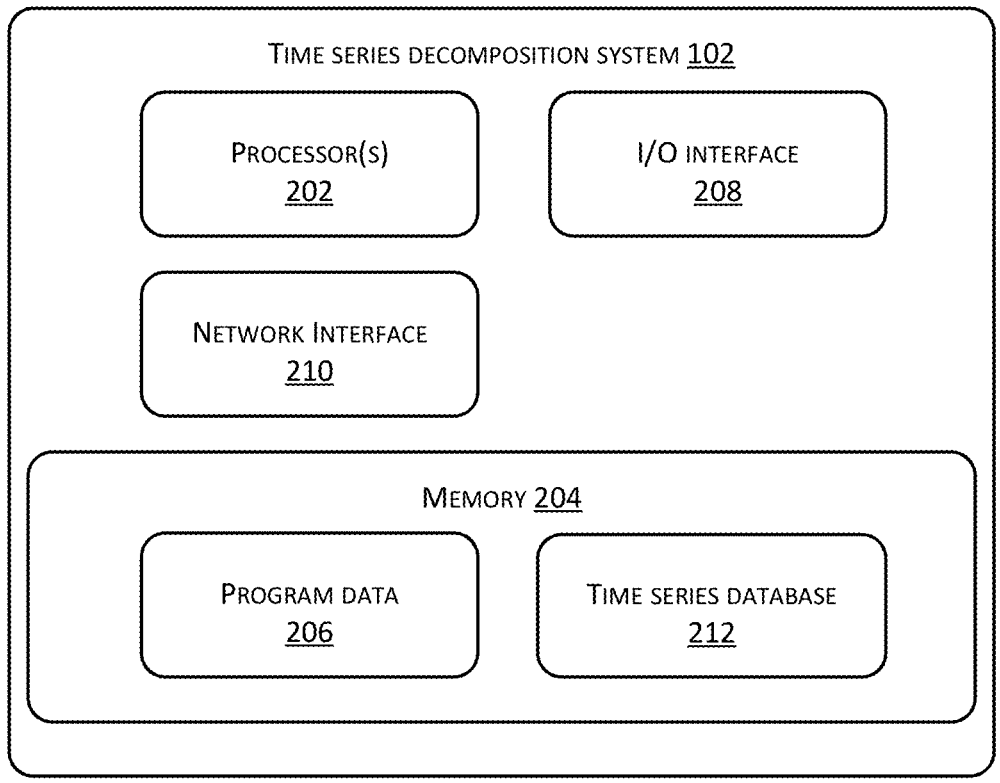
FIG. 2 illustrates an example seasonal-trend composition system in more detail.

FIG. 2 illustrates the time series decomposition system 102 in more detail. In implementations, the time series decomposition system 102 may include, but is not limited to, one or more processors 202, a memory 204, and program data 206. In implementations, the time series decomposition system 102 may further include an input/output (I/O) interface 208, and/or a network interface 210. In implementations, some of the functions of the time series decomposition system 102 may be implemented using hardware, for example, an ASIC (i.e., Application-Specific Integrated Circuit), a FPGA (i.e., Field-Programmable Gate Array), and/or other hardware.

In implementations, the processors 202 may be configured to execute instructions that are stored in the memory 204, and/or received from the input/output interface 208, and/or the network interface 210. In implementations, the processors 202 may be implemented as one or more hardware processors including, for example, a microprocessor, an application-specific instruction-set processor, a physics processing unit (PPU), a central processing unit (CPU), a graphics processing unit, a digital signal processor, a tensor processing unit, etc. Additionally or alternatively, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc.

The memory 204 may include computer readable media in a form of volatile memory, such as Random Access Memory (RAM) and/or non-volatile memory, such as read only memory (ROM) or flash RAM. The memory 204 is an example of computer readable media.

The computer readable media may include a volatile or non-volatile type, a removable or non-removable media, which may achieve storage of information using any method or technology. The information may include a computer readable instruction, a data structure, a program module or other data. Examples of computer readable media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include any transitory media, such as modulated data signals and carrier waves.

Although in this example, only hardware components are described in the time series decomposition system 102, in other instances, the time series decomposition system 102 may further include other hardware components and/or other software components such as program units to execute instructions stored in the memory 204 for performing various operations. For example, the time series decomposition system 102 may further include a time series database 212 storing time series data.

Example Methods

Figure 3:
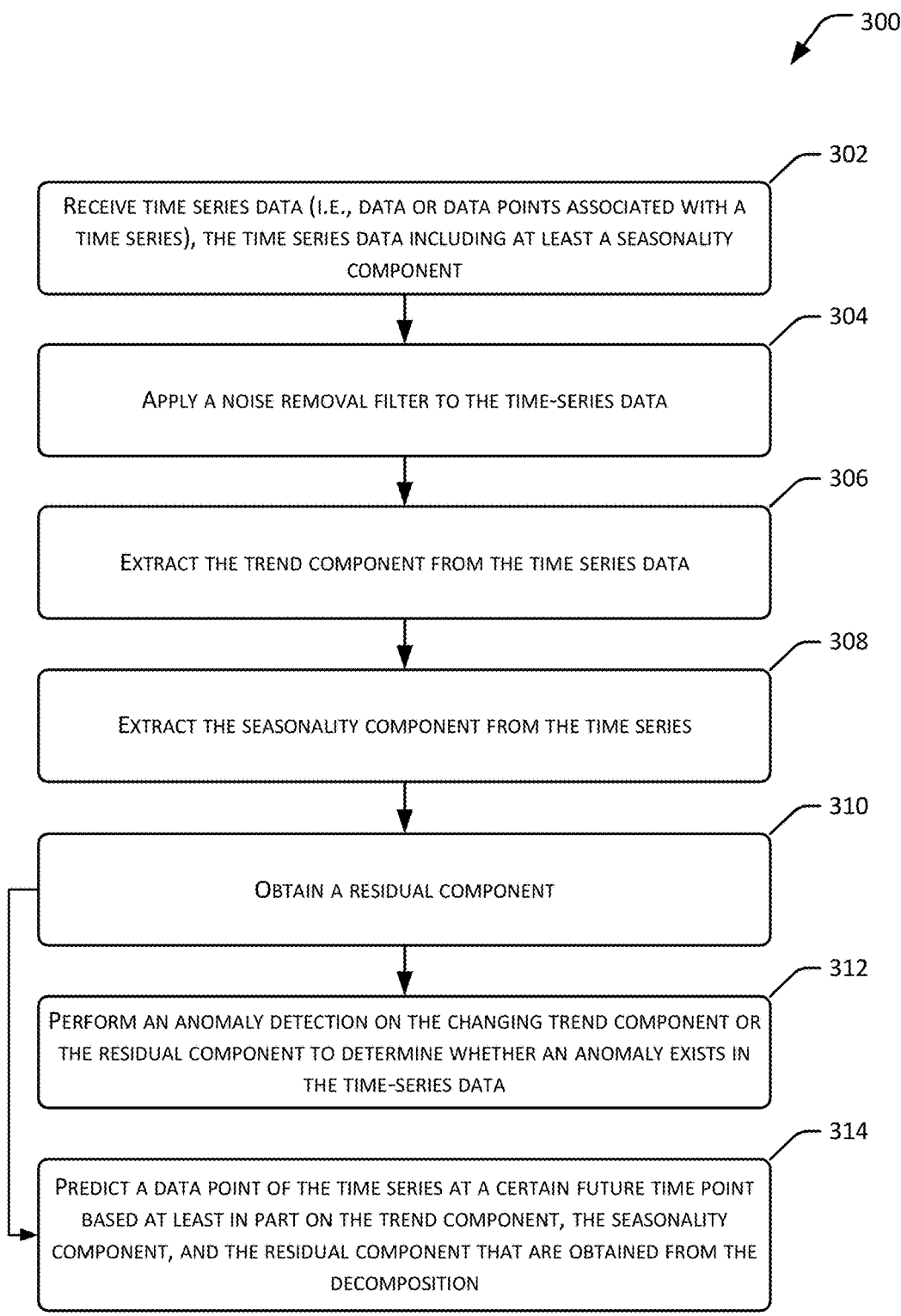
FIG. 3 illustrates an example method of seasonal-trend composition.
Figure 4:
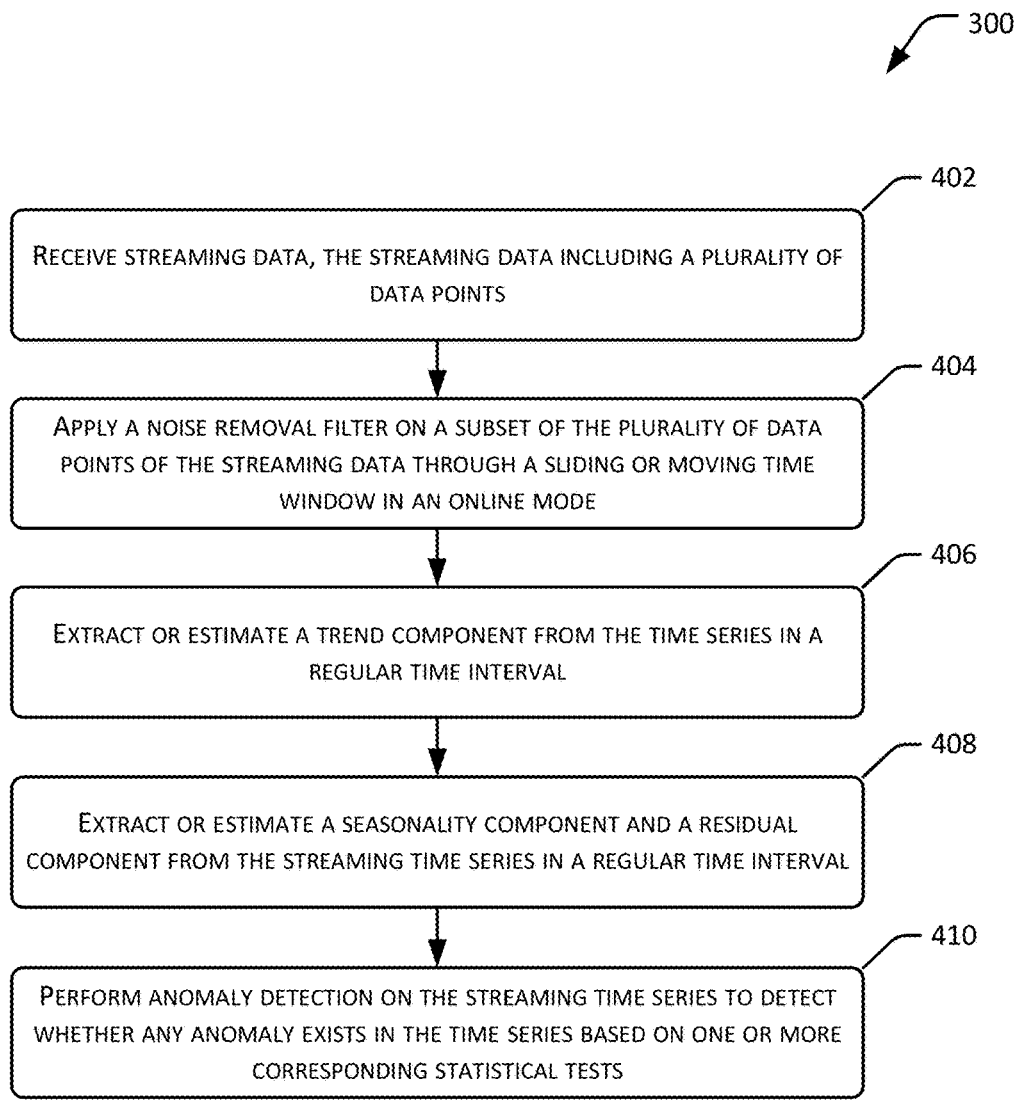
FIG. 4 illustrates an example method of online anomaly detection.

FIG. 3 shows a schematic diagram depicting an example method of time series decomposition. FIG. 4 shows a schematic diagram depicting an example method of online anomaly detection. The methods of FIGS. 3 and 4 may, but need not, be implemented in the environment of FIG. 1 and using the system of FIG. 2. For ease of explanation, methods 300 and 400 are described with reference to FIGS. 1 and 2. However, the methods 300 and 400 may alternatively be implemented in other environments and/or using other systems.

The methods 300 and 400 are described in the general context of computer-executable instructions. Generally, computer-executable instructions can include routines, programs, objects, components, data structures, procedures, modules, functions, and the like that perform particular functions or implement particular abstract data types. Furthermore, each of the example methods are illustrated as a collection of blocks in a logical flow graph representing a sequence of operations that can be implemented in hardware, software, firmware, or a combination thereof. The order in which the method is described is not intended to be construed as a limitation, and any number of the described method blocks can be combined in any order to implement the method, or alternate methods. Additionally, individual blocks may be omitted from the method without departing from the spirit and scope of the subject matter described herein. In the context of software, the blocks represent computer instructions that, when executed by one or more processors, perform the recited operations. In the context of hardware, some or all of the blocks may represent application specific integrated circuits (ASICs) or other physical components that perform the recited operations.

Referring back to FIG. 3, at block 302, the time series decomposition system 102 may receive time series data (i.e., data or data points associated with a time series), the time series data including at least a seasonality component.

In implementations, the time series decomposition system 102 may receive time series data (i.e., data or data points associated with a time series) from the client device 104 or one of the one or more servers 106. The time series data may include a series of data points arranged in an order of time. In implementations, the time series data may correspond to a certain real-world application, such as daily or hourly numbers of users accessing a certain website, daily or hourly closing values of a certain stock index, daily or hourly numbers of vehicles passing a certain road, etc. In implementations, the time series data may include at least a seasonality component with a seasonality length that may or may not be known, such as a daily or weekly seasonality length. In implementations, the time series data may further include a trend component that may be constant (i.e., no trend), or a trend component can be slowly changing or with abrupt changes.

At block 304, the time series decomposition system 102 may apply a noise removal filter to the time series data.

In implementations, the time series data may include a plurality of different components, such as a trend component, a seasonality component, a residual component, an outlier component, and a noise component. By way of example and not limitation, the time series data $(y_1, \ldots, y_N)$ may be decomposed into or formulated as the following form:

$$y_t = s_t + \tau_t + r_t, t = 1, 2, \ldots, N \qquad (1)$$

where $y_t$ represents an observation at time t, $s_t$ represents a seasonality component with a period length (seasonality length) T, $\tau_t$ represents a trend component, and $r_t$ represents a residual component.

In implementations, the trend component may include a trend component with slowly increase or decrease, or a trend with abrupt changes such as an abrupt level change in the trend.

In implementations, the seasonality component may include periodic patterns that fluctuate near a baseline. Additionally or alternatively, the seasonality component may include a repeated pattern that changes slowly or stays constant over time. Additionally or alternatively, the seasonality component may include a pattern that repeats regularly with a particular time period, or a pattern that shifts from one time period to another time period.

In implementations, the residual component may include signals other than signals associated with the trend component and the seasonality component in the time series data.

In implementations, this residual component may further be decomposed into two components, namely, a component associated with outliers (e.g., spikes or dips), and a component associated with noises (e.g., Gaussian noises). By way of example and not limitation, the residual component may be formulated as:

$$r_t = a_t + n_t \qquad (2)$$

where $a_t$ represents outliers (e.g., spikes or dips), and $n_t$ represents noises such as white noises.

In implementations, the time series decomposition system 102 may apply a noise removal filter on the time series data, to remove noises included in the time series data to obtain filtered time series data, i.e., $\{y_t'\}_{t=1}^N$, while preserving any change or fluctuation of a trend in the trend component $\tau_t$ (such as an abrupt change of trend) and spikes or dips in $a_t$. An example of the noise removal filter may include, but is not limited to, a bilateral filter.

By way of example and not limitation, after applying the noise removal filter such as the bilateral filter, the filtered time series data, i.e., $\{y_t'\}_{t=1}^N$ is obtained and is denoted as:

$$y_t' = \Sigma_{j \in J} w_j^t y_j, J = t, t \pm 1, \ldots, t \pm H \qquad (3)$$

where J represents a filter window with a length of 2H+1, filter weights are given by two Gaussian functions:

$$w_j^t = \frac{1}{z} e^{-\frac{[j-t]^2}{2\delta_d^2}} e^{-\frac{[y_j - y_t]^2}{2\delta_i^2}} \qquad (4)$$

where $\frac{1}{z}$ is a normalization factor, $\delta_d^2$ and $\delta_i^2$ are two parameters which control how smooth the filtered time series is to be.

After applying the noise removal filter, $y_t' = s_t + \tau_t + r_t'$, with $r_t' = a_t + (n_t - \hat{n}_t)$, where $\hat{n}_t = y_t - y_t'$, representing filtered noises.

At block 306, the time series decomposition system 102 may extract the trend component from the time series data.

In implementations, the time series decomposition system 102 may extract the trend component using, but not limited to, a robust least absolute deviation (LAD) regression with sparse regularizations. For example, $g_t$ represents a seasonal difference signal, i.e., $g_t = y_t' - t_{t-T}' = \Sigma_{i=0}^{T-1} \nabla \tau_{t-1} - (\nabla_T s_t - \nabla_T r_t')$, where $\nabla x_t = x_t - x_{t-1}$ is a first order difference operation, and the latter two seasonal difference variables may be assumed to be close to zero. In this case, extracting the trend component may be formulated as minimizing the following weighted sum objective function:

$$\Sigma_{t=T+1}^N |g_t - \Sigma_{i=0}^{T-1} \blacktriangledown \tau_{t-i}| + \lambda_1 \Sigma_{t=2}^N |\nabla \tau_t| + \lambda_2 \Sigma_{t=3}^N |\nabla^2 \tau_t| \qquad (5)$$

where $\nabla^2 x_t = \nabla(\nabla x_t) = x_t - 2x_{t-1} + x_{t-2}$ represents a second order difference operation.

The first term in Equation (5) corresponds to an empirical error using the LAD due to its robustness to outliers. The second term and the third term in Equation (5) are first-order and second-order difference operator constraints for the trend component $\tau_t$ respectively. In implementations, the second term in Equation (5) may assume that a trend difference $\nabla \tau_t$ changes slowly and may exhibit one or more abrupt level shifts (i.e., an abrupt jump or drop in a value of a trend in the trend component). The third term in Equation (5) may assume that trends in the trend component are smooth and piecewise linear such that $\nabla^2 x_t = \nabla(\nabla x_t) = x_t - 2x_{t-1} + x_{t-2}$ are sparse. By designing this implementation, the trend component $r_t$ can then capture both abrupt level shifts and gradual trend changes.

In implementations, the objective function I Equation (5) may be rewritten in an equivalent matrix form as given below:

$$\|g - M\nabla\tau\|_1 + \lambda_1 \|\nabla\tau\|_1 + \lambda_2 \|D\nabla\tau\|_1 \quad (6)$$

where $\|x\|_1 = \Sigma_i |x_i|$ represents a $l_1$-norm of a vector x, and g and $\nabla\tau$ are corresponding vector forms as shown below:

$$g = [g_{T+1}, g_{T+2}, \ldots, g_N]^T \quad (7)$$

$$\nabla\tau = [\nabla\tau_2, \nabla\tau_3, \ldots, \nabla\tau_N] \quad (8)$$

Where M and D are (N−T)×(N−1) and (N−2)×(N−1) Toeplitz matrices respectively, with the following forms:

$$M = \begin{bmatrix} 1 & \cdots & 1 & & & \\ & 1 & \cdots & 1 & & \\ & & \ddots & & & \\ & & & 1 & \cdots & 1 \end{bmatrix}^{T \text{ ones}}, D = \begin{bmatrix} 1 & -1 & & & \\ & 1 & -1 & & \\ & & \ddots & & \\ & & & 1 & -1 \end{bmatrix} \quad (9)$$

In implementations, in order to facilitate a process of solving an extraction of the trend component, the three $l_1$-norms in Equation (6) may be formulated as a single $l_1$-norm, i.e., $$f(x) := \|Ax - b\|_1 \quad (10)$$

where x represents $\nabla\tau$, and the matrix A and vector b are represented by:

$$A = \begin{bmatrix} M_{(N-T) \times (N-1)} \\ \lambda_1 I_{(N-1) \times (N-1)} \\ \lambda_2 D_{(N-2) \times (N-1)} \end{bmatrix}, b = \begin{bmatrix} g_{(N-T) \times 1} \\ 0_{(2N-3) \times 1} \end{bmatrix} \quad (11)$$

In implementations, a minimization of the $l_1$ loss in Equation (10) may be solved using linear programming (LP). Alternatively, for a large-scale $l_1$ loss minimization, an ADMM algorithm may be employed. In implementation, Equation (10) may be rewritten into an equivalent form as follows:

$$\min \quad \|y\|_1 \quad (12)$$
$$s.t \quad Ax - b = y$$

An augmented Lagrangian may be obtained as follows:

$$L_\rho(x, y, u) = \|y\|_1 + u^T(Ax - b - y) + \frac{\rho}{2}\|Ax - b - y\|_2^2,$$

where u is a dual variable, and $\rho$ is a penalty parameter. Using an ADMM procedure, updating steps may be obtained as follows:

$$x_{t+1} = \arg\min_x L_\rho(x, y, u) = (A^T A)^{-1} A^T \left(b + y_t - \frac{1}{\rho} u_t\right) \quad (13)$$

$$y_{t+1} = \arg\min_y L_\rho(x, y, u) = S_{1/\rho}\left(Ax_{t+1} - b + \frac{1}{\rho} u_t\right) \quad (14)$$

$$u_{t+1} = \arg\min_u L_\rho(x, y, u) = u_t + \rho(Ax_{t+1} - y_{t+1} - b) \quad (15)$$

where $S_\kappa(x)$ is a soft thresholding operator and is defined as:

$$S_\kappa(x) = (1 - \kappa/|x|)_+ x.$$

In implementations, O(N) complexity for updating steps of $y_{t+1}$ and $u_{t+1}$ can be achieved by equivalently implementing respective matrix-vector multiplications based on cumulative summation and shift difference of corresponding vectors due to special matrix structure as shown in Equation (9). Furthermore, $(A^T A)^{-1} A^T$ in Equation (13) can be calculated once, and then stored for updating steps to save complexity. The above ADMM algorithm can bring a faster speed than the LP algorithm, and each iteration of the ADMM algorithm is $O(N^2)$ due to the $O(N^2)$ operation for matrix multiplication in updating steps for $x_{t+1}$.

In implementations, a proposed GADMM algorithm may be designed and used by the time series decomposition system 102 for extracting the trend component. In implementations, the proposed GADMM algorithm may exploit special structures in the matrices M and D, and may further reduce the complexity from $O(N^2)$ to $O(N \log N)$ for each iteration while having the convergence being approximately the same as that of the ADMM algorithm in terms of number of iterations.

In implementations, since the matrices M and D are very like to be circulant matrices and circulant matrices have a nice property for linear systems, $\hat{M}$ and $\hat{D}$ may be added with to obtain corresponding circulant matrices $\tilde{M}$ and $\tilde{D}$ as follows:

$$\tilde{M} = \begin{bmatrix} M \\ \hat{M} \end{bmatrix} = \begin{bmatrix} 1 & \cdots & 1 & & & \\ & 1 & \cdots & 1 & & \\ & & \ddots & & & \\ & & & 1 & \cdots & 1 \\ 1 & & & 1 & \cdots & \\ \vdots & \ddots & & & \ddots & \\ \cdots & 1 & & & & 1 \end{bmatrix} \begin{matrix} \}M \\ \\ \}\hat{M}, T-1 \text{ rows} \end{matrix}$$

$$\tilde{D} = \begin{bmatrix} D \\ \hat{D} \end{bmatrix} = \begin{bmatrix} 1 & -1 & & & \\ & 1 & -1 & & \\ & & \ddots & & \\ & & & 1 & -1 \\ -1 & & & & 1 \end{bmatrix} \begin{matrix} \}D \\ \\ \}\hat{D}, 1 \text{ row} \end{matrix}$$

In implementations, $H = \tilde{A}^T \tilde{A}$, where $\tilde{A}$ is similar to A in Equation (10) with the following structure:

$$\tilde{A} = \begin{bmatrix} \tilde{M}_{(N-T) \times (N-1)} \\ \lambda_1 I_{(N-1) \times (N-1)} \\ \lambda_2 \tilde{D}_{(N-2) \times (N-1)} \end{bmatrix}, b = \begin{bmatrix} g_{(N-T) \times 1} \\ 0_{(2N-3) \times 1} \end{bmatrix} \quad (16)$$

In implementations, a difference between H and $A^T A$ may be denoted as $\hat{H}$, which may be calculated as $\hat{H} = H - A^T A = \tilde{A}^T \tilde{A} - A^T A = \hat{M}^T \hat{M} + \lambda_2^2 \hat{D}^T \hat{D}$. The updating step for $x_{t+1}$ in Equation (13) may be approximated by adding an extra proximal term $\|x - x_t\|_{\hat{H}}^2$, to reduce the complexity, i.e., $$x_{t+1} \approx \underset{x}{\text{argmin}}(L_\rho(x, y, u) + \|x - x_t\|_H^2) = \quad (17)$$

$$\underset{x}{\text{argmin}} \|Ax - y_t - b + \frac{1}{\rho}u_t\|^2 + \|x - x_t\|_H^2 = H^{-1}v$$

where v is represented by:

$$v = \hat{H}x_t + A^T\left(y_t + b - \frac{1}{\rho}u_t\right) \quad (18)$$

In implementations, the O(N) complexity for calculating v can be achieved, similar to the updating steps for $y_{t+1}$ and $u_{t+1}$ in Equations (14) and (15) due to the special matrix structure in matrix-vector multiplication. Furthermore, $H=\tilde{A}^T\tilde{A}$ is also a circulant matrix because $\hat{M}$ and $\hat{D}$ are circulant matrices. Accordingly, discrete Fourier transform (DFT) and inverse Fourier transform (IDFT) may be adopted to speed up the matrix operation $H^{-1}v$ in Equation (17). By way of example and not limitation, if F is a (N−1)×(N−1) DFT transformation matrix and h is a first column of H, the following relationship may be obtained:

$$H = F^{-1} \text{diag}(Fh) F$$

Therefore, the updating step for $x_{t+1}$ in Equation (17) may be simplified as:

$$x_{t+1} \approx H^{-1}v = F^{-1}\text{diag}^{-1}(Fh)Fv = IDFT(DFT(v) \bullet / DFT(h)) \quad (19)$$

where ./ represents a point-wise division.

Since DFT/IDFT can be efficiently computed through a fast Fourier transform (FFT) algorithm with O(N log N) operations, the complexity of the updating step for $x_{t+1}$ in Equation (19) is also O(N log N). Accordingly, based on the above analysis, the proposed GADMM algorithm (which is based on, for example, Equation (14), Equation (15), and Equation (19)) can achieve an overall O(N log N) complexity for each iteration/updating step. In implementations, the convergence of the optimality gap of the proposed GADMM algorithm is guaranteed theoretically by the following theorem:

Theorem 1: Let z denote a concatenated vector of variables (x, y, u) and let $x_*$ and $y_*$ be some optimal solution to Equation (12). Let $[z_t]_{t=1}^K$ be a sequence of solutions generated by the proposed GADMM algorithm with $u_0=0$, and some given $x_0$ and $y_0$. Let $$\bar{z}_K = \left(\frac{\Sigma_{t=1}^K x_t}{K}, \frac{\Sigma_{t=1}^K t_t}{K}, \frac{\Sigma_{t=1}^K u_t}{K}\right)$$

be a corresponding ergodic average. If $\hat{H} \geq 0$, then $$f(\bar{x}_k) - f(x_*) \leq \frac{1}{K}\left(\frac{1}{2\rho}M + \frac{\rho}{2}(\|y_0 - y_*\|^2 + \|x_0 - x_*\|_{\hat{H}}^2)\right) \quad (20)$$

where M is the number of rows in the matrix A. In particular, if $\rho = \sqrt{M}/\sqrt{\|y_0 - y_*\|^2 + \|x_0 - x_*\|_{\hat{H}}^2}$, $$f(\bar{x}_k) - f(x_*) \leq \frac{1}{K}\sqrt{M}\sqrt{\|y_0 - y_*\|^2 + \|x_0 - x_*\|_{\hat{H}}^2} \quad (21)$$

Since $\hat{H} = \hat{M}^T\hat{M} + \lambda_2^2\hat{D}^T\hat{D}$ is semi-positive definite, the convergence of the proposed GADMM follows from Theorem 1. Furthermore, Theorem 1 generalizes the convergence result of the ADMM algorithm when being applied to Equation (12). The ADMM algorithm is a special case of the proposed GADMM when $\hat{H}=0$. In this case, Equation (20) implies that $$f(\bar{x}_k) - f(x_*) \leq \frac{1}{K}\left(\frac{M}{\rho} + \rho\|y_0 - y_*\|^2\right)$$

for the ADMM algorithm.

The following Table 1 shows a comparison of complexity and convergence of the proposed GADMM algorithm with the ADMM algorithm and the PDHG algorithm.

TABLE 1

| Algorithm | Cost per iteration | Iteration Complexity |
| --- | --- | --- |
| ADMM | $\mathcal{O}(N^2)$ | $\mathcal{O}(N/\epsilon)$ |
| PDHG | $\mathcal{O}(N)$ | $\mathcal{O}(NT/\epsilon)$ |
| Proposed GADMM | $\mathcal{O}(N\log N)$ | $\mathcal{O}(\sqrt{N}\sqrt{N + \|x_* - x_0\|_{\hat{H}}^2 /\epsilon})$ |

As can be seen from the table, if $\hat{H} = \hat{M}^T\hat{M} + \lambda_2^2\hat{D}^T\hat{D}$, this causes $\|x_* - x_0\|_{\hat{H}}^2$ to be usually much smaller than $\|y_* - y_0\|_2^2$ in practice. So, the actual number of iterations needed for the proposed GADMM is usually O(N/ϵ). Therefore, in terms of the total computational cost, the proposed GADMM usually outperforms the ADMM by a factor of O(N/log N), and outperforms the PDHG by a factor of O(T/log N).

With the proposed GADMM, the solution of Equation (12) can be obtained and denoted as $x = \nabla\tilde{\tau} = [\nabla\tilde{\tau}_2, \nabla\tilde{\tau}_3, \ldots, \nabla\tilde{\tau}_N]^T$. If $\tilde{t}_2 = \tau_1$ (which is estimated at a later time), a relative trend output based on $r_t$ may be given as:

$$\tilde{t}_t^r = \tilde{t}_t - \tau_1 = \tilde{t}_t - \tilde{t}_1 = \begin{cases} 0, & t = 1 \\ \sum_{i=2}^t \nabla\tilde{t}_i, & t \geq 2 \end{cases} \quad (22)$$

At block 308, the time series decomposition system 102 may extract the seasonality component from the time series.

In implementations, after extracting and estimating the trend component from the time series data, the time series decomposition system 102 may apply non-local seasonal filtering on the time series data. For example, $\{y_t"\}_{t=1}^N$ represents time series data after the trend component is extracted or removed. In this case, instead of considering a predetermined number (e.g., K) of data points (i.e., $y_{t-kT}", \ldots, y_{t-T}"$), the non-local seasonal filtering may consider a predetermined number of seasonal neighborhoods (e.g., previous K seasonal neighborhoods) centered at $y_{t-kT}", \ldots, y_{t-T}"$, where each neighborhood may include 2H+1 data points. K and H are positive integers greater than or equal to one. For example, a neighborhood for a certain data point $y_{t-kT}"$ may include 2H+1 neighbors, namely, $y_{t-kT-H}", y_{t-kT-H+1}", \ldots, y_{t-kT}", y_{t-kT+1}", \ldots, y_{t-kT+H}"$.

In implementations, the seasonality component may further be modeled as a weighted linear combination of $y_j''$, where $y_j''$ is located in the neighborhood as defined above. In implementations, a weight between $y_t''$ and $y_j''$ may not depend only in how far these two data points are separated in a time dimension (i.e., a difference between respective indices t and j), but also depend on how close $y_t''$ and $y_j''$ are. Intuitively, points in a neighborhood having similar seasonality with $y_t''$ may be given a larger weight. In this way, points that are seasonally similar may be found, and a problem of seasonality shift can be solved. In implementations, abnormal points may be given a smaller weight, and thus the non-local seasonal filtering can be robust or tolerance to outliers.

In implementations, an extraction of the seasonality component by the non-local seasonal filtering may be formulated as follows:

$$\tilde{s}_t = \Sigma_{(t',j) \in \Omega} w_{(t',j)}^t y_j'' \quad (23)$$

where $w_{(t',j)}^t$ and $\Omega$ are defined as:

$$w_{(t',j)}^t = \frac{1}{z} e^{-\frac{[j-t']^2}{2\hat{\sigma}_d^2}} e^{-\frac{[y_j'' - y_t'']^2}{2\hat{\sigma}_t^2}} \quad (24)$$

$$\Omega = \{(t', j) \mid (t' = t - k \times T, j = t' \pm h)\}$$

$$k = 1, 2, ..., K; h = 0, 1, ..., H$$

by considering previous K seasonal neighborhoods, where each neighborhood includes 2H+1 data points.

At block 310, the time series decomposition system 102 may obtain a residual component.

In implementations, the time series decomposition system 102 may obtain the residual component by subtracting the noise component, the trend component, and the seasonality component from the time series data. For example, after removing the noise component, the trend component, and the seasonality component from the time series data, the residual component may be represented as:

$$r_t'''' = y_t'' - \tilde{s}_t = a_t + (n_t - \hat{n}_t) + (\tau_t - \tilde{t}_t) + (s_t - \tilde{s}_t) \quad (25)$$

In implementations, the time series decomposition system 102 may further adjust the seasonality component with a constraint that a sum of all seasonality elements within a single period is zero, i.e., $\Sigma_{i=j}^{i=j+T-1} s_i = 0$. In implementations, the time series decomposition system 102 may remove an average value of the seasonality component that is obtained above, which also corresponds to an estimation of a trend point $\tau_1$ in Equation (22). Specifically, an estimated trend point may be represented as follows:

$$\hat{\tau}_1 = \frac{1}{T \lfloor N/T \rfloor} \Sigma_{t=1}^{T \lfloor N/T \rfloor} \tilde{s}_t \quad (26)$$

In implementations, respective estimates of the seasonality component, the trend component, and the residual component may be updated as follows:

$$\hat{s}_t = \tilde{s}_t - \hat{\tau}_1$$

$$\hat{\tau}_t = \tilde{\tau}_t' + \hat{\tau}_1$$

$$\hat{r}_t = r_t'''' + \hat{n}_t \text{ or } \hat{r}_t = y_t - \hat{s}_t - \hat{\tau}_t \quad (27)$$

In implementations, different elements of the estimated residual component $\hat{r}_t$ may further be derived, i.e., $$\hat{r}_t = \begin{cases} a_t + n_t + (s_t - \hat{s}_t) + (\tau_1 - \hat{\tau}_1), t = 1 \\ a_t + n_t + (s_t - \hat{s}_t) + (\tau_t - \tilde{\tau}_t), t \geq 2 \end{cases} \quad (28)$$

The above equation indicates that the residual component $\hat{r}_t$ may include residual seasonality component $(s_t - \hat{s}_t)$ and residual trend component $(\tau_t - \tilde{\tau}_t)$. Furthermore, when estimating the trend component, $\Sigma_{i=0}^{T-1} \nabla \tau_{t-i}$ may be approximated using $g_t$. In implementations, the time series decomposition system 102 may employ an alternating algorithm to obtain more accurate estimates of the trend component, the seasonality component, and the residual component. By way of example and not limitation, after obtaining estimates of the trend component, the seasonality component, and the residual component as described at blocks 304-310, the time series decomposition system 102 may repeatedly or iteratively perform operations on the residual component to further extract the trend component, the seasonality component, and the residual component as described at blocks 304-310 above, until convergence of the residual component or until a change or difference between successive estimates of the residual components is less than a predetermined threshold or percentage.

At block 312, the time series decomposition system 102 may perform an anomaly detection on the trend component or the residual component to determine whether an anomaly exists in the time series data.

In implementations, after obtaining respective estimates of the trend component, the seasonality component, and the residual component, the time series decomposition system 102 may apply one or more statistical tests on different components of the time series data to detect corresponding types of anomalies. For example, the time series decomposition system 102 may apply one or more statistical tests on the trend component to determine whether an anomaly type exists in the trend component of the time series data. In implementations, the anomaly type may include, but is not limited to, a long term monotonic trend or a change of mean. Correspondingly, the one or more statistical tests may include, but are not limited to, a t-test for the change of mean, or a MK-test for the long term monotonic trend.

In implementations, the time series decomposition system 102 may apply one or more statistical tests on the residual component to determine whether an anomaly type exists in the residual component of the time series data. In implementations, the anomaly type may include, but is not limited to, a change of variance or a type of spikes and dips. Correspondingly, the one or more statistical tests may include, but are not limited to, a F-test of equality of variances for the change of variance, or an Extreme Studentized Deviate (ESD) test for the type of spikes and dips.

At block 314, the time series decomposition system 102 may predict a data point of the time series at a certain future time point based at least in part on the trend component, the seasonality component, and the residual component that are obtained from the decomposition.

In implementations, upon estimating the trend component, the seasonality component, and the residual component, the time series decomposition system 102 may predict a data point of the time series at a particular future time point based on the trend component, the seasonality component, and the residual component using a forecasting method. Examples of the forecasting method may include, but is not limited to, an extrapolation method, a regression method, etc. The time series decomposition system 102 may send the predicted data point to a sender of the time series data (e.g., the client device 104 or one of the one or more servers 106), for making a decision such as an amount of resources to be allocated at the particular future time point, etc., based on the predicted data point.

Referring back to FIG. 4, at block 402, the time series decomposition system 102 may receive streaming data, the streaming data including a plurality of data points.

In implementations, the time series decomposition system 102 may receive streaming data associated with a time series continuously or for a certain period of time. In implementations, the streaming data may include a plurality of data points over a certain period of time.

At block 404, the time series decomposition system 102 may apply a noise removal filter on a subset of the plurality of data points of the streaming data through a sliding or moving time window in an online mode.

In implementations, in an online node or real time, the time series decomposition system 102 may consider a subset of the plurality of data points within a sliding window of width $\hat{w}$, i.e., $\hat{Y}_t = \{y_i\}_{t-\hat{w}+1}^{t}$, and apply a noise removal filter (such as the bilateral filter as described in the foregoing description, or any other suitable noise removal filter) to generate a denoised signal $\hat{Y}_t'$, where $\hat{w} \ll w$, wherein w is the total number of data points in the time series. The time series decomposition system 102 may then combine $\hat{Y}_t' = \{y_t'\}_{t-\hat{w}+1}^{t}$ with remaining points $\hat{Y}_t' = \{y_t'\}_{t-\hat{w}+1}^{t-\hat{w}}$ from $Y_{t-1}'$ that is obtained at time t−1 to approximate a full denoised signal $Y_t'$ at time t.

At block 406, the time series decomposition system 102 may extract or estimate a trend component from the time series in a regular time interval.

In implementations, the time series decomposition system 102 may perform trend extraction using the proposed GADMM algorithm in a regular time interval (e.g., after receiving a predetermined number of new data points such as 5, 10, etc., for the time series), instead of continuously, thus saving computational cost for solving an optimization problem in the proposed GADMM algorithm. Furthermore, instead of considering the entire time series (i.e w) for estimating a trend difference (i.e., $\nabla \tau$), the time series decomposition system 102 may consider a number of most recent data points of the streaming time series that are received within the sliding window (i.e., $\hat{w}$), and employ a trend component that has been estimated at time t−1 as an initial solution when solving the optimization problem in the proposed GADMM algorithm at time t, thus leading to a faster speed of convergence.

At block 408, the time series decomposition system 102 may extract or estimate a seasonality component and a residual component from the streaming time series in a regular time interval.

In implementations, similar to the trend extraction, the time series decomposition system 102 may extract or estimate a seasonality component and a residual component from the streaming time series in a regular time interval.

At block 410, the time series decomposition system 102 may perform anomaly detection on the streaming time series to detect whether any anomaly exists in the time series based on one or more corresponding statistical tests.

In implementations, the time series decomposition system 102 may detect whether one or more types of anomalies exist in the time series. Examples of the types of anomalies may include, but are not limited to, spikes and dips (SD), a change of mean (COM), and a change of variance (COV). In implementations, the spikes and dips (SD) refer to a sudden increase or decrease of observations in a predetermined time period (e.g., a very short period of time as compared to the total period of time of the time series), which may depend on the rate of sampling of the time series and the type of data of the time series. For example, the predetermined time period may be 1 or 2 minutes if the time series corresponds to numbers of users accessing a certain website per minute over a period of time. Alternatively, the predetermined time period may be 1-10 seconds if the time series corresponds to stock values of a certain stock, etc.

In implementations, the change of mean (COM) refers to an average level change over a predetermined period of time (e.g., a relatively long period of time as compared to the total period of time of the time series), which may also depend on the rate of sampling of the time series and the type of data of the time series. In implementations, the change of variance (COV) refers to an abrupt change of volatility pattern, which may be measured via variance.

In implementations, the one or more corresponding statistical tests may include, but are not limited to, an ESD test on a residual component of the time series for an anomaly type of spikes and dips, a F-test on the residual component of the time series for an anomaly type of change of variance, and a t-test on a trend component of the time series for a change of mean.

Although the above method blocks are described to be executed in a particular order, in some implementations, some or all of the method blocks can be executed in other orders, or in parallel.

Comparisons Between Different Algorithms for Trend Extraction

Since the most time-consuming and expensive operations in the time series decomposition are operations associated with the trend extraction, for the sake of further illustrating the improvements of the trend extraction method proposed in the present disclosure over existing technologies, comparisons of the proposed GADMM algorithm with other trend extraction algorithms are presented herein. By way of example and not limitation, the performance of the proposed GADMM is compared with the performance of the PDHG (Primal-Dual Hybrid Gradient) algorithm and the ADMM (Alternating Direction Method of Multipliers) algorithm. In this example, numerical experiments written in Python 3.7 on a MacBook Pro with a 2.3 GHZ Intel i5 CP and 8 GB RAM is used. An average process time and an average number of iterations required to achieve 1% optimality gap are recorded for comparison.

Figure 5:
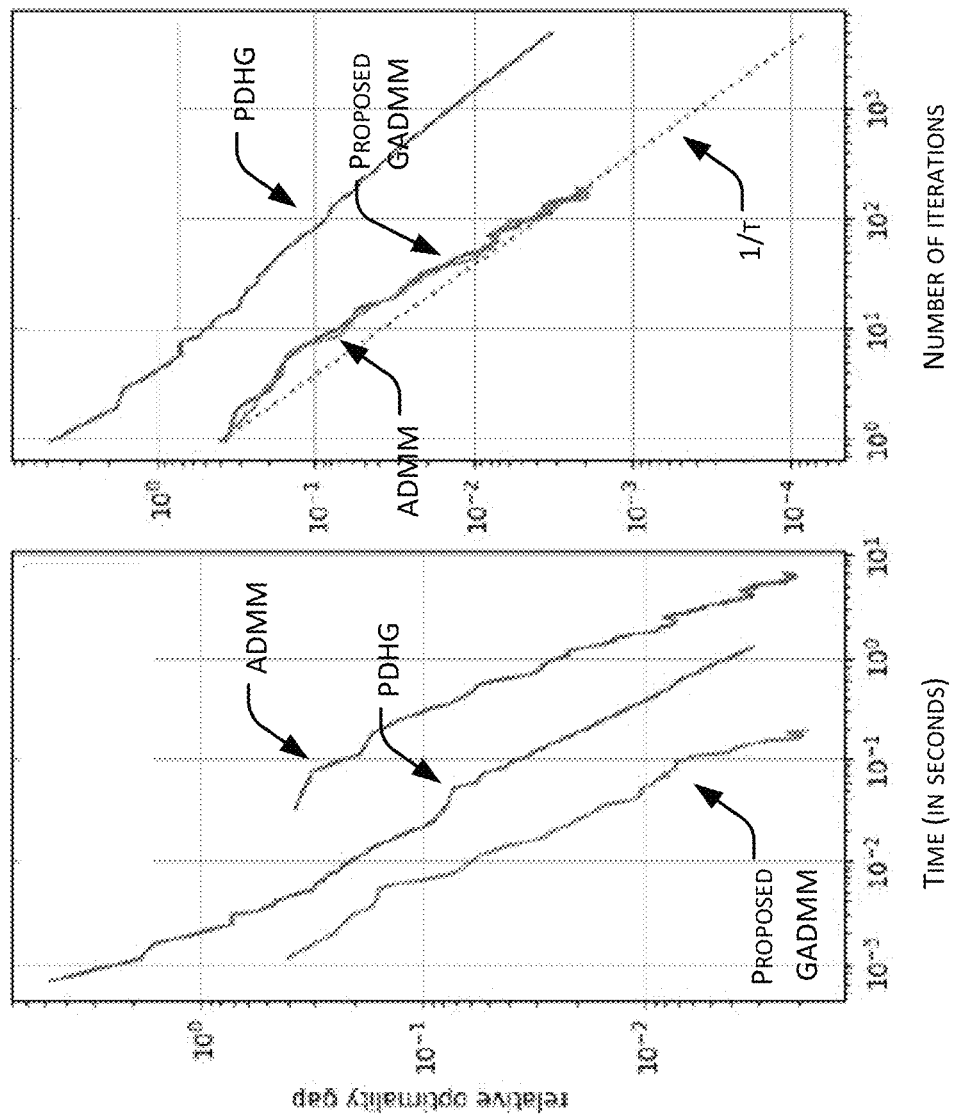
FIG. 5 illustrates an example empirical performance of an ADMM algorithm, a PDHG algorithm, and a proposed GADMM algorithm.

FIG. 5 shows the empirical performance of the ADMM algorithm, the PDHG algorithm, and the proposed GADMM algorithm on a representative signal (N=2160 and T=576, where N is the number of data points in a time series, and T is a time period of a seasonality component in a time series). All algorithms converge with the same rate, O(1/T). However, the time taken for each iteration in the proposed GADMM algorithm is shorter than the time taken for each iteration in the ADMM algorithm, and the proposed GADMM algorithm has a fewer number of iterations than the PDHG algorithm, thus the proposed GADMM algorithm having a much faster speed.

Furthermore, to illustrate the O(N/log N) improvement of the proposed GADMM algorithm over the ADMM algorithm, N (i.e., the number of data points in a time series) is varied, while keeping a ratio N/T to be fixed at 16. For example, Table 2 below shows that the proposed GADMM algorithm attains 10-144 times faster as compared with the ADMM algorithm across different N, and the number of iterations needed by the proposed GADMM algorithm is almost the same while the number of iterations needed by the PDHG algorithm scales linearly with N.

TABLE 2

A comparison among ADMM, PDHG and proposed GADMM with different values of N.

| N | Metrics | ADMM | PDHG | Proposed GADMM |
|---|---|---|---|---|
| 1080 | Number of Iterations | 41 | 310 | 37 |
| | Time (in second) | 0.142 | 0.0319 | 0.0109 |
| | Speedup | | 4.45x | 13.0x |
| 2160 | Number of Iterations | 48 | 319 | 40 |
| | Time (in second) | 1.11 | 0.0571 | 0.0295 |
| | Speedup | | 19.4x | 37.6x |
| 4320 | Number of Iterations | 68 | 602 | 37 |
| | Time (in second) | 5.98 | 0.191 | 0.0988 |
| | Speedup | | 31.3x | 60.5x |
| 8640 | Number of Iterations | 92 | 1377 | 53 |
| | Time (in second) | 36.7 | 0.62 | 0.254 |
| | Speedup | | 59.1x | 144x |

Moreover, to illustrate the O(N/log N) improvement of the proposed GADMM algorithm over PDHG, T (a time period of a seasonality component in a time series) is varied while keeping N fixed. As shown in Table 3, the number of iterations of PDHG algorithm scales linearly with T, while the proposed GADMM algorithm is insensitive to T. This advantage of the proposed GADMM algorithm over the ADMM algorithm is even more pronounced for large values of T.

TABLE 3

A comparison among ADMM, PDHG and proposed GADMM with different values of T.

| T | Metrics | ADMM | PDHG | Proposed GADMM |
|---|---|---|---|---|
| 144 | Number of Iterations | 48 | 319 | 40 |
| | Time (in second) | 0.99 | 0.0665 | 0.0226 |
| | Speedup | | 14.8x | 43.8x |
| 288 | Number of Iterations | 51 | 666 | 40 |
| | Time (in second) | 1.04 | 0.105 | 0.0225 |
| | Speedup | | 9.9x | 46.2x |
| 432 | Number of Iterations | 50 | 852 | 43 |
| | Time (in second) | 0.98 | 0.135 | 0.0239 |
| | Speedup | | 7.26x | 41.0x |
| 576 | Number of Iterations | 52 | 7493 | 46 |
| | Time (in second) | 1.11 | 0.264 | 0.0268 |
| | Speedup | | 4.20x | 41.4x |
| 720 | Number of Iterations | 59 | 1744 | 69 |
| | Time (in second) | 1.08 | 0.274 | 0.0380 |
| | Speedup | | 3.94x | 28.4x |

As can be seen from above, the proposed GADMM algorithm for trend extraction provides substantial improvement over existing technologies such as the ADMM algorithm and the PDHG algorithm.

CONCLUSION

Although implementations have been described in language specific to structural features and/or methodological acts, it is to be understood that the claims are not necessarily limited to the specific features or acts described. Rather, the specific features and acts are disclosed as exemplary forms of implementing the claimed subject matter. Additionally or alternatively, some or all of the operations may be implemented by one or more ASICS, FPGAs, or other hardware.

The present disclosure can be further understood using the following clauses.

Clause 1: A method implemented by one or more computing devices, the method comprising: receiving time series data comprising at least a seasonality component; applying a noise removal filter to the time series data; extracting a trend component from the time series data; extracting the seasonality component from the time series data; obtaining a residual component from the time series data based on the trend component and the seasonality component; and performing an anomaly detection on the trend component or the residual component to determine whether an anomaly exists in the time series data.

Clause 2: The method of Clause 1, wherein the noise removal filter comprises a bilateral filter.

Clause 3: The method of Clause 1, wherein extracting the seasonality component from the time series data comprises extracting the seasonality component from the time series data through non-local seasonal filtering.

Clause 4: The method of Clause 3, wherein the non-local seasonal filtering comprises considering a predetermined number of previous seasonal neighborhoods with each neighborhood comprising a predetermined number of data points.

Clause 5: The method of Clause 1, wherein extracting the trend component from the time series data comprises modeling the trend component in terms of at least a circulant matrix; and computing the modeled trend component using a GADMM algorithm with fast Fourier transform.

Clause 6: The method of Clause 1, wherein performing the anomaly detection on the trend component comprises applying one or more statistical tests on the trend component to determine whether an anomaly type exists in the trend component of the time series data, the anomaly type comprising a monotonic trend or a change of mean, and the one or more statistical tests comprising at least a t-test or a MK-test.

Clause 7: The method of Clause 1, wherein performing the anomaly detection on the residual component comprises applying one or more statistical tests on the residual component to determine whether an anomaly type exists in the residual component of the time series data, the anomaly type comprising at least a change of variance or a type of spikes and dips, and the one or more statistical tests comprising at least a F-test or an Extreme Studentized Deviate (ESD) test.

Clause 8: The method of Clause 1, wherein the seasonality component comprises a seasonality component having a pattern that repeats regularly with a particular time period, or a seasonality component having a pattern that shifts from one time period to another time period.

Clause 9: One or more computer readable media storing executable instructions that, when executed by one or more processors, cause the one or more processors to perform acts comprising: receiving time series data comprising at least a seasonality component; applying a noise removal filter to the time series data; extracting a trend component from the time series data; extracting the seasonality component from the time series data; obtaining a residual component from the time series data based on the trend component and the seasonality component; and performing an anomaly detection on the trend component or the residual component to determine whether an anomaly exists in the time series data.

Clause 10: The one or more computer readable media of Clause 9, wherein the noise removal filter comprises a bilateral filter.

Clause 11: The one or more computer readable media of Clause 9, wherein extracting the seasonality component from the time series data comprises extracting the seasonality component from the time series data through non-local seasonal filtering.

Clause 12: The one or more computer readable media of Clause 11, wherein the non-local seasonal filtering comprises considering a predetermined number of previous seasonal neighborhoods with each neighborhood comprising a predetermined number of data points.

Clause 13: The one or more computer readable media of Clause 9, wherein extracting the trend component from the time series data comprises modeling the trend component in terms of at least a circulant matrix; and computing the modeled trend component using a GADMM algorithm with fast Fourier transform.

Clause 14: The one or more computer readable media of Clause 9, wherein performing the anomaly detection on the trend component comprises applying one or more statistical tests on the trend component to determine whether an anomaly type exists in the trend component of the time series data, the anomaly type comprising a monotonic trend or a change of mean, and the one or more statistical tests comprising at least a t-test or a MK-test.

Clause 15: The one or more computer readable media of Clause 9, wherein performing the anomaly detection on the residual component comprises applying one or more statistical tests on the residual component to determine whether an anomaly type exists in the residual component of the time series data, the anomaly type comprising at least a change of variance or a type of spikes and dips, and the one or more statistical tests comprising at least a F-test or an Extreme Studentized Deviate (ESD) test.

Clause 16: The one or more computer readable media of Clause 9, wherein the seasonality component comprises a seasonality component having a pattern that repeats regularly with a particular time period, or a seasonality component having a pattern that shifts from one time period to another time period.

Clause 17: A system comprising: one or more processors; and memory storing executable instructions that, when executed by one or more processors, cause the one or more processors to perform acts comprising: receiving time series data comprising at least a seasonality component; applying a noise removal filter to the time series data; extracting a trend component from the time series data; extracting the seasonality component from the time series data; obtaining a residual component from the time series data based on the trend component and the seasonality component; and performing an anomaly detection on the trend component or the residual component to determine whether an anomaly exists in the time series data.

Clause 18: The system of Clause 17, wherein extracting the seasonality component from the time series data comprises extracting the seasonality component from the time series data through non-local seasonal filtering, wherein the non-local seasonal filtering comprises considering a predetermined number of previous seasonal neighborhoods with each neighborhood comprising a predetermined number of data points.

Clause 19: The system of Clause 17, wherein extracting the trend component from the time series data comprises modeling the trend component in terms of at least a circulant matrix; and computing the modeled trend component using a GADMM algorithm with fast Fourier transform.

Clause 20: The system of Clause 17, wherein: performing the anomaly detection on the trend component comprises applying one or more statistical tests on the trend component to determine whether an anomaly type exists in the trend component of the time series data, the anomaly type existing in the trend component comprising a monotonic trend or a change of mean, and the one or more statistical tests on the trend component comprising at least a t-test or a MK-test; and performing the anomaly detection on the residual component comprises applying one or more statistical tests on the residual component to determine whether an anomaly type exists in the residual component of the time series data, the anomaly type existing in the residual component comprising at least a change of variance or a type of spikes and dips, and the one or more statistical tests on the residual component comprising at least a F-test or an Extreme Studentized Deviate (ESD) test.

What is claimed is:

1. A method implemented by one or more computing devices, the method comprising:
   receiving time series data comprising at least a seasonality component;
   applying a noise removal filter to the time series data;
   extracting a trend component from the time series data, wherein extracting the trend component from the time series data comprises:
     modeling the trend component in terms of at least a circulant matrix; and
     computing the modeled trend component using a predefined algorithm with a fast Fourier transform;
   extracting the seasonality component from the time series data;
   obtaining a residual component from the time series data based on the trend component and the seasonality component; and
   performing an anomaly detection on the trend component or the residual component to determine whether an anomaly exists in the time series data.

2. The method of claim 1, wherein the noise removal filter comprises a bilateral filter.

3. The method of claim 1, wherein extracting the seasonality component from the time series data comprises extracting the seasonality component from the time series data through non-local seasonal filtering.

4. The method of claim 3, wherein the non-local seasonal filtering comprises considering a predetermined number of previous seasonal neighborhoods with each neighborhood comprising a predetermined number of data points.

5. The method of claim 1, wherein performing the anomaly detection on the trend component comprises applying one or more statistical tests on the trend component to determine whether an anomaly type exists in the trend component of the time series data, the anomaly type comprising a monotonic trend or a change of mean, and the one or more statistical tests comprising at least a t-test or a MK-test.

6. The method of claim 1, wherein performing the anomaly detection on the residual component comprises applying one or more statistical tests on the residual component to determine whether an anomaly type exists in the residual component of the time series data, the anomaly type comprising at least a change of variance or a type of spikes and dips, and the one or more statistical tests comprising at least a F-test or an Extreme Studentized Deviate (ESD) test.

7. The method of claim 1, wherein the seasonality component comprises a seasonality component having a pattern that repeats regularly with a particular time period, or a seasonality component having a pattern that shifts from one time period to another time period.

8. One or more computer readable media storing executable instructions that, when executed by one or more processors, cause the one or more processors to perform acts comprising:

receiving time series data comprising at least a seasonality component;
applying a noise removal filter to the time series data;
extracting a trend component from the time series data, wherein extracting the trend component from the time series data comprises:
  modeling the trend component in terms of at least a circulant matrix; and
  computing the modeled trend component using a predefined algorithm with a fast Fourier transform;
extracting the seasonality component from the time series data;
obtaining a residual component from the time series data based on the trend component and the seasonality component; and
performing an anomaly detection on the trend component or the residual component to determine whether an anomaly exists in the time series data.

9. The one or more computer readable media of claim 8, wherein the noise removal filter comprises a bilateral filter.

10. The one or more computer readable media of claim 8, wherein extracting the seasonality component from the time series data comprises extracting the seasonality component from the time series data through non-local seasonal filtering.

11. The one or more computer readable media of claim 10, wherein the non-local seasonal filtering comprises considering a predetermined number of previous seasonal neighborhoods with each neighborhood comprising a predetermined number of data points.

12. The one or more computer readable media of claim 8, wherein performing the anomaly detection on the trend component comprises applying one or more statistical tests on the trend component to determine whether an anomaly type exists in the trend component of the time series data, the anomaly type comprising a monotonic trend or a change of mean, and the one or more statistical tests comprising at least a t-test or a MK-test.

13. The one or more computer readable media of claim 8, wherein performing the anomaly detection on the residual component comprises applying one or more statistical tests on the residual component to determine whether an anomaly type exists in the residual component of the time series data, the anomaly type comprising at least a change of variance or a type of spikes and dips, and the one or more statistical tests comprising at least a F-test or an Extreme Studentized Deviate (ESD) test.

14. The one or more computer readable media of claim 8, wherein the seasonality component comprises a seasonality component having a pattern that repeats regularly with a particular time period, or a seasonality component having a pattern that shifts from one time period to another time period.

15. A system comprising:
one or more processors; and
memory storing executable instructions that, when executed by one or more processors, cause the one or more processors to perform acts comprising:
  receiving time series data comprising at least a seasonality component;
  applying a noise removal filter to the time series data;
  extracting a trend component from the time series data, wherein extracting the trend component from the time series data comprises:
    modeling the trend component in terms of at least a circulant matrix; and
    computing the modeled trend component using a predefined algorithm with a fast Fourier transform;
  extracting the seasonality component from the time series data;
  obtaining a residual component from the time series data based on the trend component and the seasonality component; and
  performing an anomaly detection on the trend component or the residual component to determine whether an anomaly exists in the time series data.

16. The system of claim 15, wherein extracting the seasonality component from the time series data comprises extracting the seasonality component from the time series data through non-local seasonal filtering, wherein the non-local seasonal filtering comprises considering a predetermined number of previous seasonal neighborhoods with each neighborhood comprising a predetermined number of data points.

17. The system of claim 15, wherein:
performing the anomaly detection on the trend component comprises applying one or more statistical tests on the trend component to determine whether an anomaly type exists in the trend component of the time series data, the anomaly type existing in the trend component comprising a monotonic trend or a change of mean, and the one or more statistical tests on the trend component comprising at least a t-test or a MK-test; and
performing the anomaly detection on the residual component comprises applying one or more statistical tests on the residual component to determine whether an anomaly type exists in the residual component of the time series data, the anomaly type existing in the residual component comprising at least a change of variance or a type of spikes and dips, and the one or more statistical tests on the residual component comprising at least a F-test or an Extreme Studentized Deviate (ESD) test.

* * * * *